April 5, 1960 W. HARRISON 2,931,512
PORTABLE METER RACK
Filed June 18, 1956 2 Sheets-Sheet 1
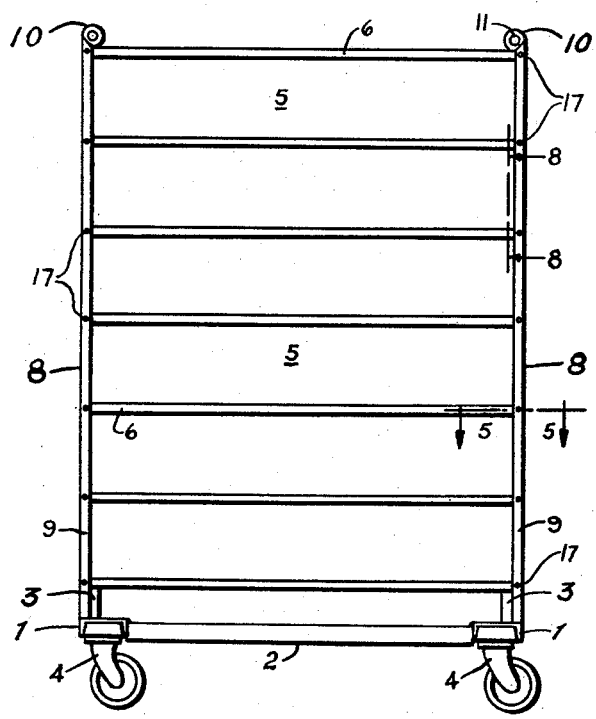
Fig. 1
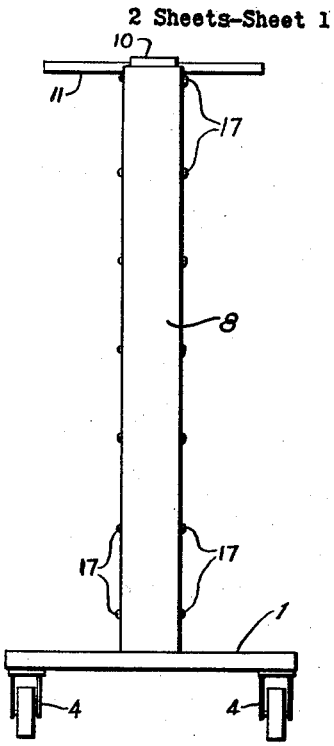
Fig. 2
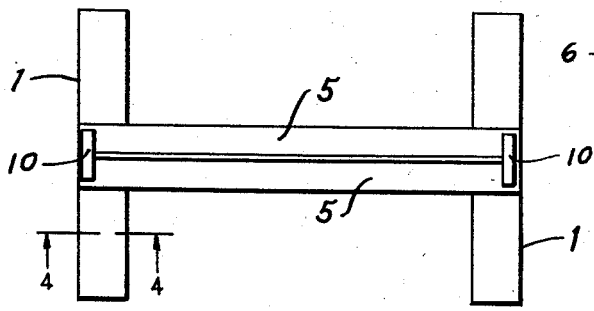
Fig. 3
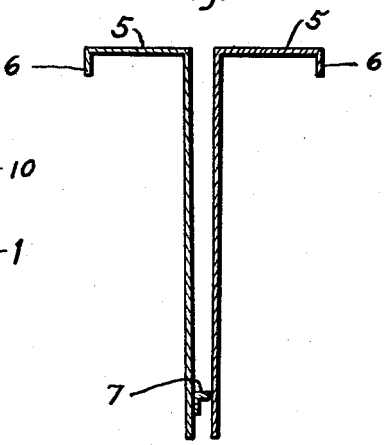
Fig. 5
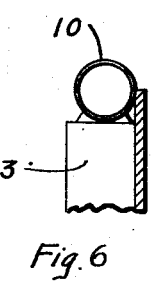
Fig. 4
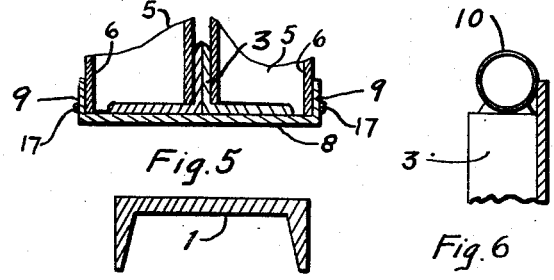
Fig. 6
Fig. 7
INVENTOR.
Wallace Harrison INVENTOR.
Wallace Harrison

United States Patent Office 2,931,512
Patented Apr. 5, 1960

2,931,512

PORTABLE METER RACK

Wallace Harrison, Knoxville, Tenn.

Application June 18, 1956, Serial No. 592,136

2 Claims. (Cl. 211—26)

This invention relates to a portable meter rack and more particularly to a rack particularly suited for use with a socket connected electric meter of the type known in the trade as "S."

In devices of this general character heretofore devised for storing and moving meters it has been the usual practice to hang bottom connected meters on stationary racks and to store meters on work benches and tables. When used with socket connected meters such for example as the type known as "S" having a circular base of greater diameter than the glass cover thereof and a plurality of connecting members extending from the base in a direction parallel to the axis thereof and a hanger which is turned to one position when the meter is in service and to another position when the meter is hung on a hook in storage, it is necessary to position the hanger before placing the meter on the stationary rack. Furthermore it has been found in certain instances that these hangers are so mounted that it is necessary to employ a tool such, for example, as a screw driver or a special tool to shift them from one position to another and in still other instances the hangers are so mounted that their weight will cause them to shift from one position to another. It has also been found necessary to employ both hands to hang the meter on a hook unless the hanger has been prepositioned. Furthermore the configuration of the type "S" meter is such that it is difficult to remove it from a hook and place it on a flat surface without subjecting the meter to an injurious mechanical shock.

The present invention possesses all of the advantages of the prior art devices and none of the foregoing disadvantages. To achieve this desirable result I have provided a portable meter rack suitable for storing and transporting a plurality of meters in closely spaced mutual adjacency in which means are provided for carrying the meters in a locked position thereon in such manner that there is no possibility of damage or mechanical injury to the meter during the loading, transportation and unloading thereof and in which all meters are continually visible and individually selectable at will for removal from the rack without the use of a tool for this purpose and in which the loading and unloading of the meter with respect to the rack is accomplished easily, quickly and safely, as will appear in greater detail as the description proceeds.

One of the objects of the present invention is to provide a portable electric meter rack having new and improved means for securing the meters thereto.

Another of the objects is to provide a new and improved meter carrying rack in which the meters are locked thereto in horizontal rows by stop members individual to each row of meters engaging a surface portion of the base thereof in response to gravitational force acting on the meters.

A further object is to provide a meter rack having an I-shaped base and shallow shelves in back-to-back relationship to conserve floor space while providing a stable support for the weight of heavy meters.

A still further object is to provide a meter rack having T-shaped supports extending vertically from the ends of a base and channel-shaped members attached to the supports with their flanges extending inwardly, with horizontal shelves having depending back portions attached to the T-shaped members and depending flanges attached to the flanges of the channel-shaped members.

Still another object is to provide a portable meter rack having new and improved means for locking a plurality of horizontal rows of meters in back-to-back relationship thereon.

A still further object is to provide a portable meter rack having new and improved means for quickly mounting two groups of meters in back-to-back relation thereon, the meters of each group being arranged in horizontal groups being disposed in a vertical plane and in which rows and each of the rows of meters in each of the the meters are mounted in a locked position on the rack quickly and without employing a tool for this purpose.

Various other objects, advantages and improvements will become apparent from the following description taken in connection with the accompanying drawings of which:

Fig. 1 is a view in elevation of a portable meter rack of the present invention according to a preferred embodiment thereof;

Fig. 2 is an end view of the device of Fig. 1;

Fig. 3 is a plan view of the device of Fig. 1;

Fig. 4 is an enlarged view taken along line 4—4 of Fig. 3;

Fig. 5 is an enlarged view taken along the line 5—5 of Fig. 1;

Fig. 6 is a fragmentary view partially in section of one of the devices for detachably securing a handle to the rack;

Fig. 7 is an enlarged view in section of a pair of shelf elements in back-to-back relation on which is shown a stiffening and supporting element;

Figure 8:
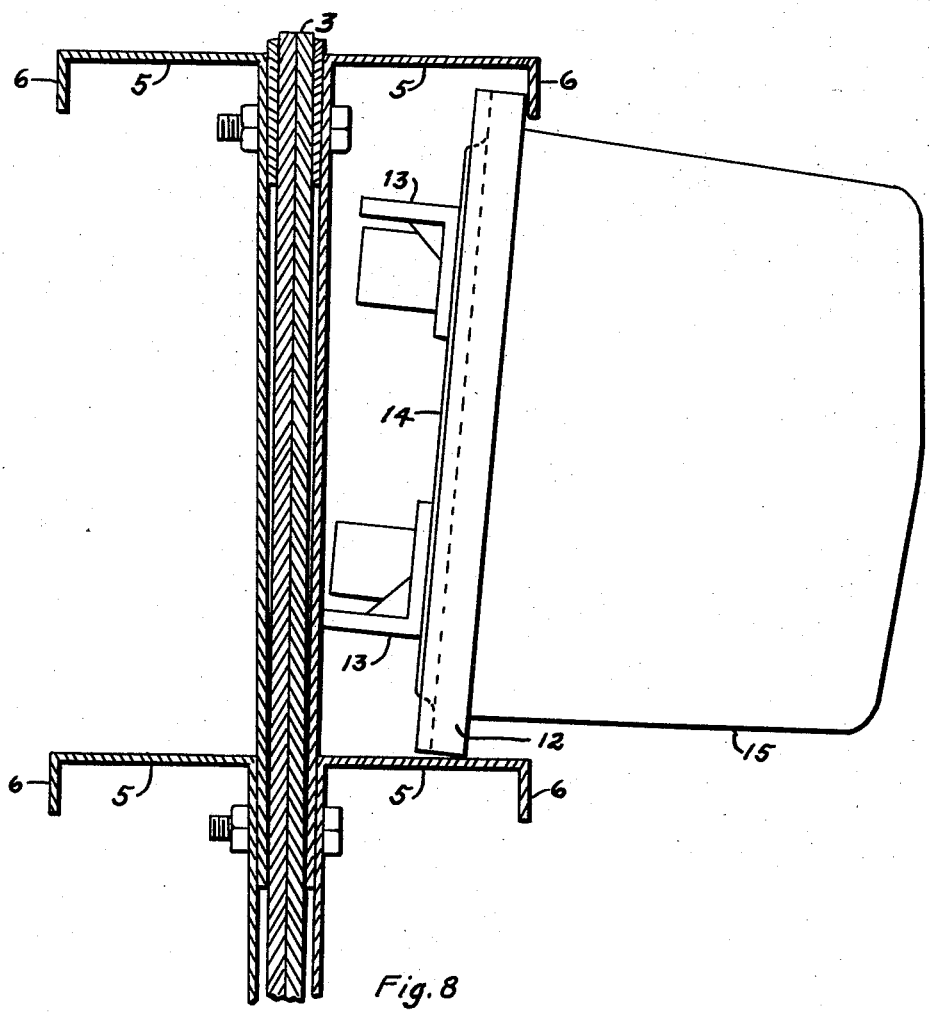
Fig. 8 is a greatly enlarged view taken along the line 8—8 of Fig. 1 showing the shelf structure and a meter locked thereby.

Referring now to the drawings on which like numerals of reference are employed to designate like parts throughout the several views and more particularly to Fig. 1 thereof there is shown thereon a portable meter rack for supporting a plurality of electric meters each having an enlarged circular base in such manner that the meters may be quickly and easily locked thereon without employing a tool for this purpose, the structure comprising a base having two laterally extending channel members 1 interconnected by a rigid member 2 in any suitable manner such, for example, as by welding the parts together substantially as shown. The base is supported by a plurality of casters 4, each of the casters being pivotally secured to an end portion of the members 1.

Secured to each of the base members 1 substantially as shown is a T-shaped support 3 composed preferably of two angle elements secured together by welding or riveting, each of the supports 3 being welded preferably to a mid-portion of the element 1 such that the supports or elements 3 are vertical when the casters 4 are resting on a flat level surface.

Referring now to Fig. 8 there is secured to the vertical supports 3 as by the bolts illustrated a plurality of L-shaped shelves 5, the outer end of which is formed downwardly to provide a flange or plate 6 and the inner end of which is formed downwardly to provide an elongated flange or back plate. An arrangement is thus provided in which a plurality of shelves are bolted together in back-to-back relation and secured at the end portions thereof to the vertical supports 3. The end portions of the shelves are covered by a flanged strip of metal 8 attached to and extending throughout the length of the supports 3 and having a pair of flanged strips 9 formed thereon secured to flanged portion 6 of each of the shelves as by the screws 17 illustrated. The strips 8 are employed to add rigidity to the shelves, prevent meters from rolling off the end portions of the shelves and to improve the appearance of the rack.

Figure 9:
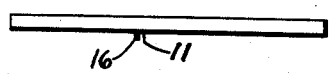
Fig. 9 is a view of a handle suitable for locking engagement with the supporting structure of Fig. 6.

In Fig. 9 is shown a rod or tubular member 11 adapted to be slideably carried by the support 10, Figs. 1, 2 and 6, and having a pin 16 projecting therefrom for engagement between an end portion of the tubular support 10 and one of the flanges 9 of the end piece or plate 8. This is achieved by rotation of the handle 11 after the pin 16 thereof has been brought into abutting engagement with an end surface of the tubular support 10.

Referring now to Fig. 8 for a more complete understanding of the invention there is shown thereon an electric meter 15 having a circular cover band 12, a meter base 14 and a plurality of elements 13 composed of insulating material protruding from the base substantially as shown. The vertical separation between a pair of shelves 5 is somewhat greater than the diameter of the cover band 12 and the depth of the shelf is somewhat in excess of the distance between the flat outer surface of the cover band 12 and the innermost surface of the insulator element 13. By this arrangement it will be apparent that the meter may be placed in locked position on the shelf by inserting the cover band into the downwardly projecting flanged portion 6 of the upper shelf 5 and thereafter rotating the meter to the position shown in Fig. 8. When in this position the top part of cover band 12 rests against flange 6 and the bottom part of the cover band rests on the next lower shelf 5 in such manner that one of the insulators 13 engages the back plate of the upper shelf 5. The meter is thus locked in response to gravitational force acting thereon until it has been raised and pivoted about the upper flanged portion sufficiently for the cover band 12 to clear the flange 6. When this position has been obtained the meter may be lowered and removed from the rack. It is an important feature of this invention that the placing of the meters in the locked position on the rack and the removal of the meters therefrom is all achieved without the use of a tool and, if desired, this entire operation may be accomplished by an operator by the use of one hand only. Furthermore locking is achieved without employment of any moving part on the rack.

From the foregoing it will be clearly apparent that the invention contemplates the provision of a portable carrier for electric meters in which the meters may be carried in locked condition in horizontal closely spaced rows in such manner that the meters may be arranged in two groups in back-to-back relation supported by shelves in such manner that a locking device formed on the shelf immediately superjacent the shelf carrying the meter is employed to lock the meter under the action of the gravitational force applied to the meter.

Although the invention has been described with reference to a preferred embodiment thereof having six shelves on each side thereof on which the meters may be carried in locked condition, it will be understood that this is by way of example only and that the number of shelves may be increased or decreased as desired.

Whereas the invention has been described with particular reference to a specific example thereof which gives satisfactory results, it is not so limited as it will be understood by those skilled in the art, after understanding the invention, that various changes and modifications may be made without departing from the spirit and scope of the invention and it is my intention therefore in the appended claims to cover all such changes and modifications.

What is claimed as new and desired to be secured by Letters Patent of the United States is:

1. A meter rack comprising an elongated base, a vertical support attached to and extending upwardly from each end of the base, and a plurality of pairs of inverted channel-shaped members extending horizontally between and attached to the vertical supports, each channel of a pair having one elongated flange in proximity to the other channel and one shorter flange spaced from the other flange, and each pair of channel-shaped members being spaced vertically from the adjacent pair of channel-shaped members a distance substantially greater than the length of their shorter flanges but less than the length of their elongated flanges.

2. In a rack for supporting electric watthour meters in upright positions for convenient reading of dials and name plate data, a base consisting of a longitudinal member and two transverse members attached to the longitudinal member at its ends, a vertical member attached to each end of the longitudinal member, and a plurality of pairs of supports attached horizontally between the vertical members, each pair of supports being spaced vertically from the adjacent pair of supports, the support of each pair comprising a horizontal plate, a first vertical plate in proximity to the other support of the pair and a second vertical plate spaced from both the first vertical plate and the horizontal plate of the subjacent support, the horizontal plate of each support extending transversely from the center of the rack substantially less than the transverse base members.

References Cited in the file of this patent

UNITED STATES PATENTS

| | | |
|---|---|---|
| 725,851 | Kopp | Apr. 21, 1903 |
| 1,267,740 | Brennan | May 28, 1918 |
| 1,293,752 | Gibson | Feb. 11, 1919 |
| 1,446,036 | Dodd | Feb. 20, 1923 |
| 1,465,777 | Cantelo | Aug. 21, 1923 |
| 2,414,334 | Schild | Jan. 14, 1947 |